AUTOMATIC TELEPHONE SWITCHING SYSTEM

Filed July 24, 1962

3 Sheets-Sheet 1

INVENTORS
SHIGEKI YAMATO
KO MUROGA
YOSHIKAZU MIYAMOTO
BY
OSTROLENK, FABER, GERB & SOFFEN
ATTORNEYS

INVENTORS
SHIGEKI YAMATO
KO MUROGA
BY YOSHIKAZU MIYAMOTO

OSTROLENK, FABER, GERB & SOFFEN
ATTORNEYS 3,231,680

AUTOMATIC TELEPHONE SWITCHING SYSTEM

Shigeki Yamato, Ko Muroga, and Yoshikazu Miyamoto, Tokyo, Japan, assignors to Nippon Electric Company Limited, Tokyo, Japan Filed July 24, 1962, Ser. No. 211,962
Claims priority, application Japan, July 26, 1961, 36/26,868
16 Claims. (Cl. 179—18)

This invention relates to switching systems and more particularly to automatic switching systems for telephone networks, which is so designed as to provide, both automatically and at extremely high speeds, the status of each subscriber to the system simultaneously with the subscriber's identifying code, and which is further adapted to scan the entire system at high speeds to provide monitoring of the entire system in a relatively short period of time.

In high speed electronically controlled automatic telephone switching systems, it becomes extremely necessary to provide all electronic automatic monitoring circuits for ascertaining the conditions of each subscriber line and further, of identifying each subscriber line by an appropriate identifying code. The instant invention provides a novel arrangement for performing all of the above mentioned functions in an automatic high speed manner wherein the system has an extremely high degree of reliability of operation.

In presently known telephone switching systems identifying codes are provided, which codes are employed to identify the subscriber directory number, the subscriber equipment number, the subscriber service class, such as for example, individual or party subscriber pay station and so forth. Each subscriber equipment number is associated with an equipment position located at the subscriber location. Means are included in the instant invention for providing, upon receipt of the subscriber identifying number, each of the other identifying numbers which identify the type of subscriber, the subscriber equipment number, and so forth, as mentioned above. This function is performed by means of a semi-permanent type memory arrangement which is comprised of an address selection circuit for selecting addresses which correspond to each subscriber directory number, or trunk index number, a semi-permanent means and a read out facility provided for reading out the information related to the subscriber group number. A scanning circuit is provided for scanning the subscriber lines of the telephone switching system in order to detect the conditions of each individual subscriber line, such as for example, the call originating condition [off hook condition], busy, or idle condition, and the lock out condition. The subscriber scanning circuit is further adapted to control the address selection circuit in order to directly associate the condition of the subscriber line being sensed, with the various identifying information groups associated with that particular subscriber.

The instant invention is characterized by associating an address selection circuit with both the subscriber number group and the subscriber scanning circuitry, which arrangement provides economy of equipment necessary, substantial decrease of the necessary holding time of the common control circuit, and simplification of the control circuit sequence. The instant invention is comprised of a scanning means which sequentially connects one subscriber line at a time to a semi-permanent memory arrangement. The semi-permanent memory arrangement receives the sequencing information from the address selection circuit and is arranged so as to convert this information into other identifying numbers for the particular subscriber line being monitored at the given instant. The associated identifying codes are made available for further utilization at a read out facility of the semi-permanent memory. The term semi-permanent memory is employed to mean a memory matrix, or assembly, which generates output signals in response to input signals presented in a predetermined arrangement, upon its plurality of input terminals, and which is further adapted so as to enable alteration of the relationships between the input and output terminals thereof. A more thorough description of such a semi-permanent memory arrangement is set forth in Serial No. 201,680, entitled, A Converter for Converting a Semi-Permanent Memory Into an Electrical Signal, filed, June 11, 1962, by Takashi Ishidate, and assigned to the assignee of the instant invention. The subscriber scanning circuit is further adapted to energize the subscriber line detector circuits which are employed for the purpose of detecting the condition of the particular subscriber line being monitored and for providing signals representative of this information, simultaneous with the output from the semi-permanent memory. All of the information is transferred into the control circuitry and is made available immediately upon the energization of the scanning circuit by means of the central control circuit.

It is therefore one object of this invention to provide a monitoring means for a plurality of information lines, wherein the state of each line being sensed is coupled with appropriate identifying code.

Another object of the instant invention is to provide a novel scanning and status determining circuit which has a novel arrangement for providing at its output facility the status of each subscriber line scanned, together with the subscriber line identifying code.

Still another object of this invention is to provide a novel scanning and status determining circuit having a semi-permanent memory arrangement coupled with the status determining circuit so that both circuits generate their output signals simultaneously.

These, and other objects, will become apparent when reading the accompanying description and drawings in which.

Figure 1:
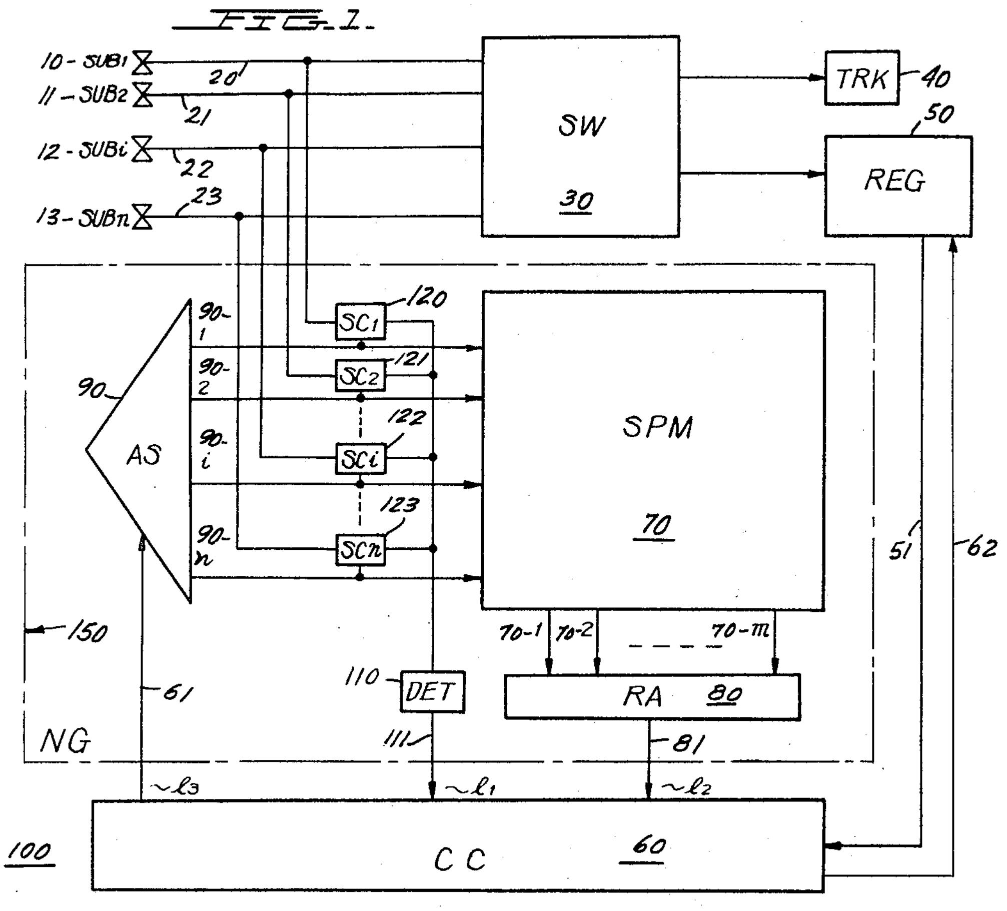
FIGURE 1 is a block diagram showing an automatic telephone switching system employing the scanning and status determining circuit designed according to the principles of the instant invention.

Referring now to the drawings:

FIGURE 1 shows an automatic telephone switching system 100, in schematic block diagram form, wherein symbols 10 through 13 represent subscriber locations. It should be noted that for the sake of clarity, only four such subscriber locations have been shown. However, the system of the instant invention works equally as well with a substantially greater number of subscriber locations, or even with a lesser number of subscriber locations. Each subscriber location has a subscriber line circuit 20 through 23, respectively, associated with the subscriber location equipment. A plurality of subscriber line condition detecting circuits 120 through 123, are connected respectively to the line circuits 20 through 23 respectively, and are employed as will be more fully described, for the purposes of determining whether the associated subscriber line is not being used, busy, about to be used, et cetera. The subscriber lines 20 through 23 are fed into a switching network 30, of a type known to the prior art, which is employed to automatically connect the calling subscriber with the called subscriber, upon completion of the dialing operation at the calling subscriber location. Circuit 40 represents a trunk line circuit which is employed for connecting telephone exchanges, such as a switching network 30, to one another. The switching network 30 is connected to a register circuit 50 for registering the dial number and storing the calling subscriber number, and so forth, which information is transferred from register 50 to the central control 60.

The remainder of the system shown contained within the rectangular broken line 150, constitutes the essential part of the instant invention and is comprised of an address selection circuit 90, which sequentially and/or at random marks each subscriber line 20 through 23 in a manner to be more fully described, under control of the central control 60, by means of connection 61. The output terminals 90–1 through 90–*n* of address selection circuit 90, are connected to associated input terminals of the semi-permanent memory circuit 70, and are further connected to input terminals of the status detection circuits 120 through 123. The semipermanent memory output terminals 70–1 through 70–*m* are impressed upon a read out circuit 80, provided to provide read out signals at a suitable voltage level, to the central control 60, which connection is represented by the line 81.

The address selection circuit 90 supplies an output signal to only one of the *n* information output terminals 90–1 through 90–*n*, at any given instant, under control of the central control 60. This operation is performed by a local generating source and a pulse counting circuit provided in the control circuitry 60, and to be more fully described, which sequentially steps the address selection circuit 90, in order to select and monitor the associated subscriber lines. For example, considering an arbitrary output terminal 90–*i* of the output terminals of address selection circuit 90, this terminal is electrically connected to both the subscriber line circuit 122 and the input terminal of the semi-permanent memory circuit 70, and upon receipt of an output signal, imposes this signal upon the subscriber line status detection circuit 122 and the semi-permanent memory 70. The status information is then transmitted from the status detecting circuit 122 to a detector gathering means 110, which transfers this information to the central control 60, which information is designed so that it arrives simultaneously with coded information representing the subscriber equipment number, subscriber service class, and so on, which information is stored in the semi-permanent circuit 70, and which is subsequently transmitted to the central control 60 through the read out amplifier 80.

The semi-permanent memory equipment 70 consists of a matrix arrangement having *m* columns and *n* rows in which the presence, or absence, of an electrical condition, such as for example, an impedance condition which is coupled at the cross points between each column and row, and is provided for transferring the desired information from row to column, for example. It should be understood that any type of electrical condition, so long as it may represent two distinguishable states, may be employed for connecting the cross points between rows and columns. As recited in the aforementioned copending U.S. Patent application Serial No. 201,680, the cross point coupling means are provided on a semi-fixed, or semi-permanent basis wherein they may be altered at any time in order to change the converting relationship between the *m* rows and the *n* columns of the matrix. As further examples, any prior art ring translator, metal card memory, capacitive memory and twister type memory may be used as the semi-permanent memory equipment.

Upon receipt of an electrical signal from the address selection circuit, which is applied to the *i*th column of memory circuit 70, the electrical signal is transmitted to each of the rows connected at the cross points to the *i*th column. The read out information is thereby comprised of the information derived from the row terminals connected to the *i*th column terminal which was chosen by the address selection circuit 90. The energized row columns are connected to the read out amplifier circuitry 80, which provide signals of suitable voltage levels to the central control 60, which signals are representative of the information corresponding to the subscriber 12 using the subscriber line 22.

The manner in which the connections of the switching system are made are as follows:

Assuming that the address selection circuit 90 of the scanning and status detecting system 150 is scanning all subscribers in succession, when the detection circuit 110 detects that a subscriber has removed his hand set to enter into the call originating state, this detected signal is transmitted to the central control 60 via the information transmission path 111. Simultaneously therewith the information such as the subscriber equipment numbers, subscriber service class, and any other such information corresponding to the originating subscriber, are converted by the semi-permanent memory circuit 70 and read out by the read out amplifiers 80 into the central control 60 via the information transmission path 81. The information which is transmitted through the information transmission path 111 is presented to the central control 60 as a service request from the call originating subscriber. The central control 60 becomes blocked, i.e., it terminates stepping of the address selection circuit 90 upon receipt of said service request information. After receipt of the information relating to subscriber equipment number and subscriber status through the lines 81 and 111 respectively, the central control 60 releases the scanning and status circuit 150 enabling the scanning circuit 150 to begin scanning all subscribers connected to the scanning circuitry. The central control which is connected to the register 50 by line 62 selects any one of the idle registers in the register circuitry 50, thereby connecting the originating subscriber and the registers through the speech path switching network 30 and at the same time transmitting information such as the subscriber equipment number, the subscriber service class, and so forth, corresponding to the originating subscriber to the register for storing therein.

Upon completion of this operation the central control is released to provide for any other kind of operation.

The calling subscriber then begins the dialing operation and this dialing information is stored in the selected register through the switching network 30. Upon completion of the storing operation of the dialing information, the chosen register connects with the central control 60, transmitting information to the circuit 60, such as the dialing information, that is, the called subscriber directory number and the information that has been stored therein, such as the call originating subscriber equipment numbers, subscriber service class and so on. When the called subscriber is in the same switching equipment exchange as the call originating subscriber, that is in the case of an intra-office call, the central control 60 terminates the sequential scanning operation of the status determining the scanning circuit 150 and the register circuit 50 through line 51, controls circuit 60 and line 61, impresses the called subscriber's address in the manner of random scanning upon the address selection circuit 90, which generates an output signal at the appropriate output terminal, which is impressed upon the associated subscriber circuit corresponding to the called subscriber and simultaneously therewith impresses the signal upon the appropriate column in the semi-permanent memory circuit 70 corresponding to the designated called subscriber's address. The status of the called subscriber line is determined by the called subscriber line status determining circuit to ascertain whether the called subscriber circuit is under idle condition, or busy condition, and simultaneously therewith the converted information from the semipermanent memory circuit 70 which has stored therein the called subscriber equipment number, service class, and so forth, associated with the called subscriber, reads this information out via the read out amplifier circuit 80. All of this information is impressed upon the central control 60 through the information transmission paths 111 and 81, respectively. Upon receipt of this information, the central control 60 again releases the status determining and scanning circuit 150 and on the basis of the information received selects any one of the idle intra-office trunks, such as for example, the trunk 40 if the said called subscriber is not busy at this time, then acts to the call originating subscriber and the called subscriber to the selected trunk circuit in the trunk arrangement 40 through the switching network 30, thus effecting the connecting operation between calling and called subscriber.

Although the above description refers specifically to the most typical situation, which is that of a calling subscriber initiating a call request to a called subscriber through an intra-office trunk circuit, it should be noted that the arrangement of the instant invention may be used advantageously in more complex and more sophisticated arrangements. For example, the system of the instant invention is readily adaptable to handle information of various kinds of trunk line circuits in the same manner as recited above. This may be done by installing a plurality of detector circuits which are capable of detecting the call originating condition and the idle, or busy condition of a trunk line circuit (in the case of an incoming trunk circuit), which detection circuits are connected in the same manner as the status detection circuits 120 through 123, shown in FIGURE 1. Further, the semi-permanent memory circuit 70 may be designed as to accommodate information for trunk line equipment numbers and associated identifying codes. By providing serially numbered index addresses to similar categories of trunk circuits, such as intra-office trunks and outgoing trunks, the necessary trunk circuits can then be collected, a group at a time, by operating the central control 60 to select a necessary category of trunk circuits by specifying the first index address of the necessary trunk group with a number of the trunk circuits of the trunk group to the address selection circuit. In this manner the time required for completing the selection of an idle trunk circuit can be greatly reduced.

When an idle trunk circuit is selected the trunk equipment number corresponding to the selected trunk circuit is given by the information stored in the semi-permanent memory circuit 70 in the same manner as described previously in the case of subscribers. With present telephone switching systems the mention made for initiating a call through an incoming trunk must be accomplished within a time interval limited by the minimum pause of the dialing mechanism. Therefore, detection of the call originating condition must be performed much more rapidly than in the case of an ordinary subscriber. According to the instant invention, scanning of incoming trunks alone in precedence to ordinary subscribers can be easily accomplished in the same way as in the case of selecting trunk circuit groups by annexing facilities capable of detecting any one of the incoming trunks being under a call originating condition.

Figure 2:
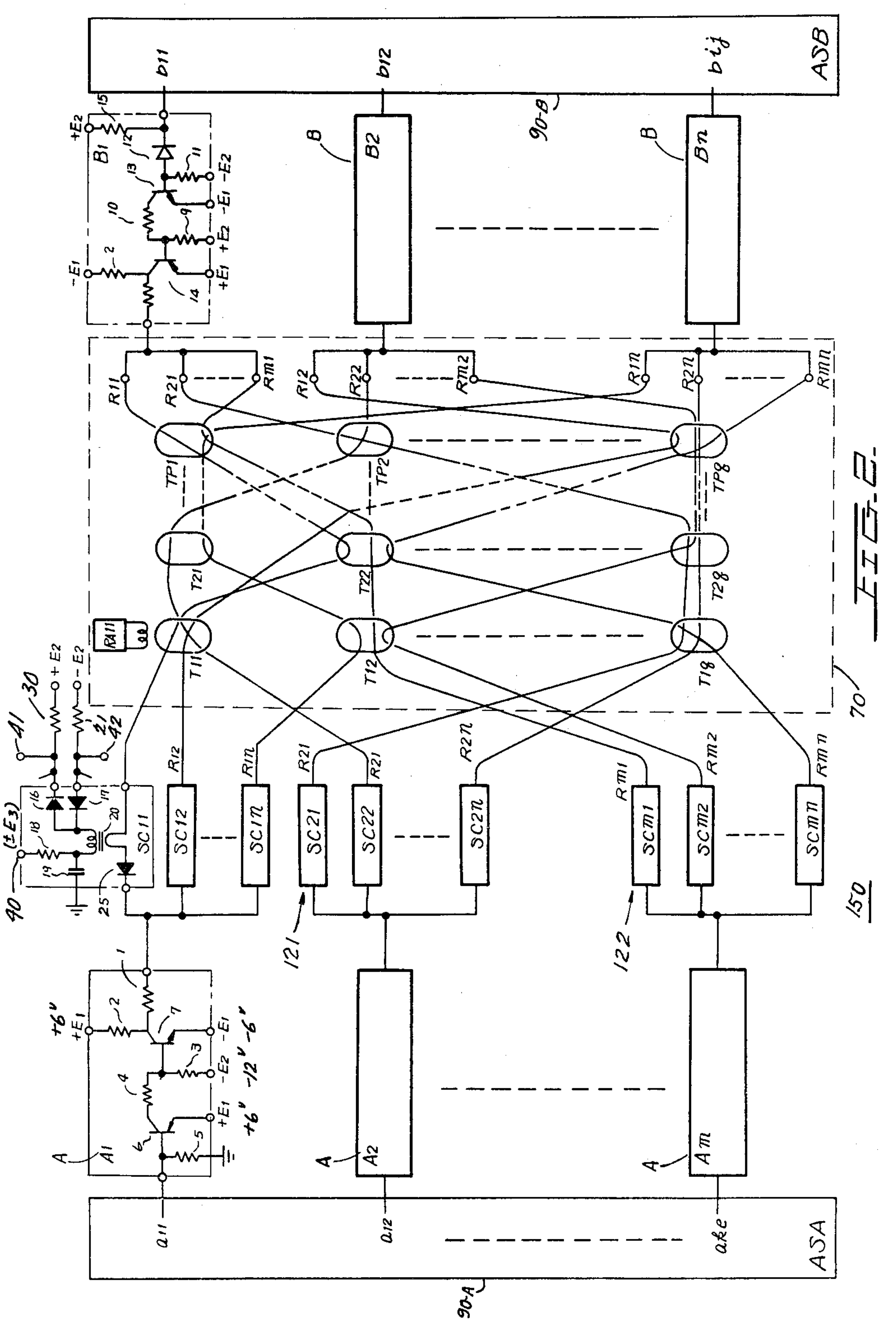
FIGURE 2 shows a more detailed view of the scanning circuit status determining circuit and semi-permanent memory circuit of the system of FIGURE 1.

The status detecting circuits and semi-permanent memory are shown in greater detail in FIGURE 2 and the arrangement 150 shown therein is comprised of a plurality of driving amplifiers, $A_1, A_2 \ldots A_m$ and $B_1, B_2$, and . . . $B_n$ which operate respectively under the control of the address selection circuits 90–A and 90–B respectively. The address selection circuits 90–A and 90–B are so designed that only one driving amplifier in each of the A and B amplifier groups operates at any given instant. The subscriber circuits shown as the circuit groups 120 through 122, in FIGURE 2, are arranged so that each group is comprised of individual subscribing circuits wherein group 120 is comprised of the status determining circuits SC11, SC12, . . . SC1*n*; the group 121 includes the status determining circuits SC21, SC22, SC2*n* and so forth. This arrangement provides a total of *m* times *n* subscriber circuits which are connected to the number of group circuit, i.e., the address selection circuit wherein each circuit is provided with the capabilities of transmitting either a call originating state and an idle or busy condition of the associated subscriber line connected to the status determining circuit and of transmitting this information to the detection circuit 110 when a driving pulse is received by this circuit by means of its associated amplifiers $A_1$ through $A_m$ respectively. The semi-permanent memory 70 is comprised of a plurality of transformer members T11, T12 . . . T1Q, T21, T22 . . . T2Q . . . TP1, TP2 . . . TPQ, which designations represent the information translating transformers consisting of P groups each group having Q transformers. The transformers are divided for translating subscriber directory numbers into the subscriber equipment number and the subscriber service class and so forth. It should be recognized that the number of P and Q may be any quantity depending strictly upon the needs of the particular system in which the memory circuit 70 is employed. The transformers T may be of any suitable design such as the well-known magnetic cores which are designed to magnetically couple connecting lines threaded therethrough so that upon the impression of a signal impulse in a column line the magnetic core generates a signal in the column line for the column threaded therethrough.

Each subscriber group which has been established is provided with frame numbers, group numbers, file numbers, subscriber service classes and so forth, for each subscriber of the group, all of which codes, including the subscriber equipment number are assigned to one specific subscriber. As one example, for the subscriber circuit SC11, the route the column wire is comprised of driving amplifier $A_1$, status determining circuit SC11, transformers T11, T22, TP1 and driving amplifier B1 so that row line R11 passes through one transformer or magnetic core 2 in each transformer group. Read-out amplifiers RA11 through RAPQ are connected to the secondary or output windings of each transformer or magnetic core for the purpose of reading out the information stored in the semi-permanent memory 70 related to each subscriber in the system.

When a particular subscriber is designated by the address selection circuit 90–A and 90–B and a pulse flows through the primary winding of the transformers T belonging to that subscriber, induced voltages are generated in the secondary windings of the transformers (one in each group), which voltage pulses are detected by the associated read out amplifiers RA and the amplified voltage pulses are then transmitted to the central control 60. Although only two such read out amplifiers RA11 and RA21 are shown in FIGURE 2, this is shown merely for the purposes of simplicity and it should be understood that the number of read out amplifiers to be installed must be sufficient to accommodate all of the magnetic cores.

The operation of the driving amplifiers $A_1$ through $A_m$ is as follows:

First, let it be assumed, with reference to FIGURE 2, that +E1 is +6 volts, −E1 is −6 volts, −E2 is −12 volts and +E2 is +12 volts, all of which voltage levels are employed for operating the driving amplifiers $A_1$ through $A_m$. Regarding the input information to the driving amplifiers from the address selection circuit 90–A, it is assumed that all but one of the driving amplifiers $A_1$ through $A_m$ have +12 volts impressed upon their input terminals and that only one of these amplifiers $A_1$ through $A_m$ has an open circuit at its input terminal. Assuming that the amplifier A has a +12 volts at its input terminal, this +12 volt potential is impressed upon the base electrode of the PNP transistor 6, since +6 volts is impressed upon the emitter electrode of the transistor 6, the transistor 6 is reverse biased thereby placing it in the cut-off condition. This causes the emitter junction of the NPN transistor 7 to be reverse biased, since the emitter voltage of transistor 7 is at a −6 volts, while the base voltage of transistor 7 is substantially at −E2, or −12 volts, which voltage source is connected through resistor 3. Both transistors 6 and 7, being in the cut-off condition, this places the positive voltage +E1 (+6 volts) at the collector terminal of transistor 7, via the resistor 2.

Assuming now that the other condition is present at amplifier A, such that an open circuit condition exists at the input terminal, the base electrode of transistor 6 is at a more negative potential relative to the emitter electrode of transistor 6 thereby forward biassing the transistor causing it to become conductive and go into a state of saturation. Thus the potential +E1, i.e., +6 volts appears at the collector of transistor 6 through a relatively low impedance. If the resistances of the resistors 3 and 4 are so selected that the base potential of the transistor 7 produced by the voltage division of the potential +E1 and −E2 by means of resistors 3 and 4 are chosen so as to be at a higher voltage level than −6 volts then the base of the NPN transistor 7 is placed in a forward bias condition causing transistor 7 to conduct and go into a state of saturation. Thus the collector of transistor 7 is substantially at the −6 volts or −E1 voltage level with relatively low impedance, therefore, potential −E1 appears at the output terminal of the driving amplifier A through resistor 1. It should be understood that if the driving amplifier $A_1$ is selected to become the conductive state, at this time potential +E1 or +6 volts appears through the corresponding resistor 2 at the output terminal of each of the remaining driving amplifiers $A_2$ through $A_m$.

The operation of the amplifiers B will now be considered:

Let it first be assumed that the voltages +E1, +E2, −E1, −E2 are at the same potential levels as the voltages +E1, +E2 and −E1, −E2 of the amplifiers A described previously. Further, the information impressed upon all of the driving amplifiers $B_1$ through $B_n$ is at the zero volt, or ground potential level, except for a selected one of the driving amplifiers. The diode 12 in the amplifier circuit B is of the zener type having a zener voltage rated at approximately 12 volts. Referring now to the schematic representation of the amplifier, as shown at $B_1$, in FIGURE 2, the base potential of the transistor 13 is chosen to be lower than the input potential by approximately 12 volts. Assuming that a zero volt or ground potential level is applied to the input terminal *b*11 of amplifier $B_1$, this imposes a voltage difference across the zener diode 12 of approximately 12 volts which is insufficient to obtain zener action from the diode 12. Thus the base electrode of the transistor 13 is biased by both the input potential of zero volts and the emitter potential of −6 volts, placing transistor 13 in the cut-off condition. In the cut-off condition the collector potential of transistor 13 is substantially at the voltage level +E2 and since the emitter potential of the PNP transistor 14 is at the potential +E1, transistor 14 is thereby reverse biased causing transistor 14 to also be placed in the cut-off condition. Consequently, the potential −E1 appears at the collector electrode of the PNP transistor 14 via resistor 2.

Assuming that the amplifier B has the open circuit condition impressed upon its input terminal *b*11, then a voltage potential of substantially 24 volts is impressed across zener diode 12 causing a zener action to be generated therein, which enables a current to flow from +E2 through resistor 15, zener diode 12 and resistor 11 to potential −E2. The resistances 11 and 15 are chosen so that a voltage level substantially more positive than the emitter voltage −E1 of transistor 13 causing transistor 13 to become conductive such that the collector electrode thereof is connected to the potential −E1 through the low impedance of the transistor 13. The resistance values of resistors 9 and 10 are so chosen that the base potential of PNP transistor 14, with transistor 13 in the conductive state, divides the potentials −E1 and +E2, so that a potential substantially more negative than the potential +E1 is present at the base electrode thereof, causing the base emitter junction of transistor 14 to be forward biased driving the transistor in duty conductive state thereby connecting the collector electrode of transistor 14 to the voltage level +E1 through the low impedance of the conducting transistor. In this manner the potential +E1 appears through the resistor 1 at the output terminal of only one driving amplifier such as for example the driving amplifier $B_1$, which has been designated by the input information from the address selection circuit, while the voltage potential −E1 appears through the resistors 2 at the output terminal of every other remaining driving amplifier $B_2$ through $B_n$.

Figure 3:
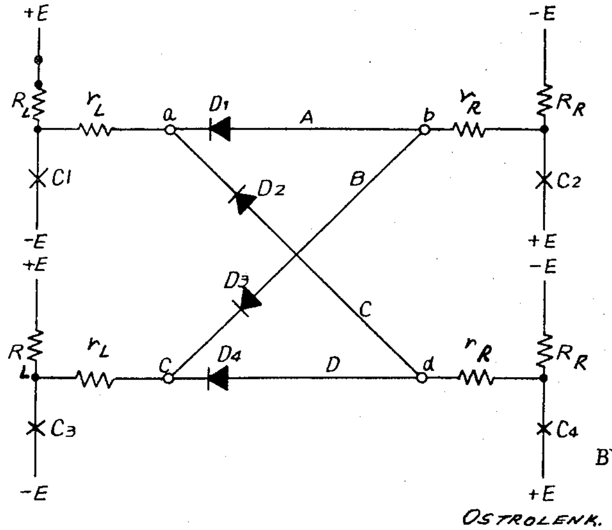
FIGURE 3 shows a schematic diagram illustrating, in detail, the operation of a portion of the network of FIGURE 2.

A portion of the driving amplifiers and semi-permanent memory, as shown in FIGURE 2, has been reproduced in FIGURE 3 and shown therein schematically for the purpose of explaining the operation of the semi-permanent circuit 70 controlled by the address selection circuits 90–A and 90–B. FIGURE 3 is presented for clarifying the understanding of the circuit operation of FIGURE 2. FIGURES 2 and 3 are correlated in the following manner:

In FIGURE 3, four exemplary driving amplifiers, representing the amplifiers A and B of FIGURE 2, are represented by the resistances R, *r*, and mechanical make contacts C. The two amplifiers on the lefthand side correspond to the driving amplifiers A and are represented by $R_L$, $r_L$, and $C_1$ and $C_3$, while the two amplifiers on the righthand side correspond to the driving amplifiers B and are represented by $R_R$, $r_R$, and $C_2$ and $C_4$. The resistances $R_L$ and $R_R$ correspond to the collector load resistances 2 contained in the final stage transistor of the driving amplifiers. The resistances $r_L$ and $r_R$ correspond to the current limiting resistances 1 contained in the final stage transistor of driving amplifiers A and B. The diodes, or semi-conductors $D_1$ through $D_4$ correspond to the diode 25 contained in any four of the subscribers status detection circuit 120, each diode being connected between any one of the A amplifiers and any one of the B amplifiers. The voltages +E in FIGURE 3 corresponds to the emitter power supplies of transistor 14 in amplifiers B and the collector power supplies of transistor 7 in amplifiers A. Power supplies, or voltages, −E1 in FIGURE 3 correspond to the collector power supply of transistor 14 of amplifiers B and the emitter power supply of transistor 7 in amplifiers A, as shown in FIGURE 2. $C_1$ and $C_3$ designate mechanical make contacts which replace and represent the NPN transistors 7 connected to the output sides of the two driving amplifiers out of the *m* driving amplifiers $A_1$ through $A_m$ which are connected to the diodes $D_1$, $D_2$ and $D_3$ and $D_4$, respectively. $C_2$ and $C_4$ denote mechanical make contacts which represent the two PNP transistors 14 on the output side of any two of *n* driving amplifiers $B_1$ through $B_n$.

Referring to FIGURE 2, the driving amplifiers $A_1$ through $A_m$ and $B_1$ through $B_n$ are designed so as to be scanned in succession by the address selection circuits 90–A and 90–B, respectively, in such a manner that no two amplifiers of the amplifier groups A and B may be scanned simultaneously. There is no possibility that contacts $C_1$ and $C_3$ can be closed simultaneously. Likewise, there is no possibility that contacts $C_2$ and $C_4$ may be closed simultaneously in FIGURE 3. The power supply voltages +E1 and −E1, as described previously are so determined as to have values equal in magnitude and opposite in polarity each from the other.

The operation of the circuit of FIGURE 3 is as follows:

Assuming that the contacts $C_1$ and $C_2$ are closed, and that the remaining contacts $C_3$ and $C_4$ are therefore open, consider the current and voltage conditions of all routes A, B, C and D, which inter-connect the branching points, *a*, *b*, *c*, and *d*.

(1) Considering route A with contact $C_2$ closed and contact $C_1$ closed, diode $D_1$ is forward biased and a current flows from voltage source +E through contact $C_2$, resistance $r_R$, diode $D_1$, resistance $r_L$ and contact $C_1$, to voltage source −E with diode $D_1$ conducting. The voltage levels at branch points *a* and *b* are substantially zero assuming that the voltage drop across diode $D_1$ is negligible, and that the resistances of $r_L$ and $r_R$ are equal.

(2) Considering route B, a potential +E appears at the branch point *c* since contact $C_3$ is in the open condition. Since the potential at branch point *b* is substantially at zero voltage, diode $D_3$ is reverse biased and is placed in a cut-off condition.

(3) Considering route C, a potential −E appears at the branch point *d* since contact $C_4$ is open at this time. Since the potential at point *a* is substantially at the zero voltage level, diode $D_2$ is reverse biased with the result that it is placed in a cut-off condition.

(4) Considering route D, a potential +E appears at the branching points *c* since contact $C_3$ is open and a potential −E appears at the branching point *d* since contact $C_4$ is in the open condition. This results in diode $D_4$ being reverse biased placing diode $D_4$ in the cut-off condition.

As will be evident from the descriptions 1 through 4 above, a current flows through route A only, establishing a connection between the two closed contacts $C_1$ and $C_2$, whereas no current whatsoever flows through any one of the remaining routes B through D because the diodes contained in these routes are under cut-off condition. Referring to FIGURE 2, it will be evident that the current flows similarly through the single route which connects between the two designated driving amplifiers of the groups A and B, thus energizing only the status detection circuit and the magnetic cores related to the single line, or route, which has become energized.

The driving amplifier groups $A_1$ through $A_m$ and $B_1$ through $B_n$ are designed in such a manner that the current flow therethrough increases rapidly from cut-off to a constant current value so as to provide a direct current pulse. The current pulse is sufficient to induce voltages in the secondary windings of the magnetic cores T comprising the ring translators contained in the chosen route and further, inducing a voltage in the secondary winding of the transformer 20 contained in the subscriber circuit, such as for example, the subscriber circuit SC11 shown in FIGURE 2.

The operation of the subscriber circuit in the presence of such a voltage in the secondary winding of transformer 20 is as follows:

If the subscriber associated with the subscriber line being monitored is in the off-hook (call originating) condition, let it be assumed that an input voltage $-E_3$, the absolute value of which is greater than a voltage $+E_2$, is applied to the input terminal 40 of the status detection circuit SC11. Thus, the voltage level $-E_3$ is substantially more negative than the voltage level $-E_2$, causing diode 17 to conduct, thereby establishing a current path from $-E_2$ through resistor 31, diode 17, secondary winding of transformer 20, resistor 18, and terminal 40, to voltage level $-E_3$. Thus, upon the impression of the D.-C. current pulse at the primary winding of transformer 20, a pulse is generated in the secondary winding of transformer 20, which appears at the call originating detection terminal 41. If, for example, the subscriber is in the busy state, a voltage level of $+E_3$, the absolute value of which is greater than the voltage $+E_2$, is applied to the information input terminal 40 of the subscriber circuit causing the diode 16 to become conductive and establishing a current path from voltage $+E_3$ to terminal 40, resistor 18, secondary winding of transformer 20, diode 16, resistor 30, to voltage $+E_2$. Thus when the voltage pulse is induced in the secondary winding of transformer 20, this pulse appears at the subscriber busy detection terminal 42. If the subscriber is in the idle state, a zero, or ground potential is applied at terminal 40, so that both diodes 16 and 17 are in the cut-off condition and no output voltage pulses are presented to the detection terminals 41 or 42. Therefore, by connecting all of the call originating detection terminals 40, to a common call originating detector, and further, by connecting all of the busy state detection terminals 42 to a single busy state detection circuit, a state of any subscriber specified by the address selection circuit is then available at the central control 60 of FIGURE 1.

The operation of the semi-permanent memory in the selected number group circuit for the same selected route as described above, is as follows:

When a pulse current flows through the specified route as was previously described, the induced voltages at the secondary windings of the transformers which connect the magnetic cores T to the read out amplifiers RA impress the induced voltages upon the read out amplifiers. The secondary windings are chosen so as to generate code combinations representative of information such as equipment number, and service class of the system subscribers, which subscribers are specified in a sequential manner by the address selection circuits 90–A and 90–B. Thus, this information may be made available from the read out amplifiers through the central control circuit 60 in the manner as was previously described with reference to FIGURE 1.

From the above mentioned descriptions, it will be evident that the status of any subscriber, together with the subscriber information, such as equipment number and service class, is obtained simultaneously, which is a significant feature of the instant invention. The preferred embodiment of the instant invention is as shown in FIGURE 2, where the information translating equipment and subscriber circuits are combined electronically. In this particular example, the driving amplifiers A and B are chosen so as to be directly related to the subscriber's telephone directory numbers. For example, a subscriber's circuit connected to the route between amplifier A23 and the amplifier B45 may be chosen so as to identify a subscriber whose telephone directory number is "2345." With this arrangement, any subscriber can be designated by means of a telephone directory number, while the corresponding information, such as the equipment number and service class are obtained simultaneously with the status of the subscriber's telephone line.

Figure 4:
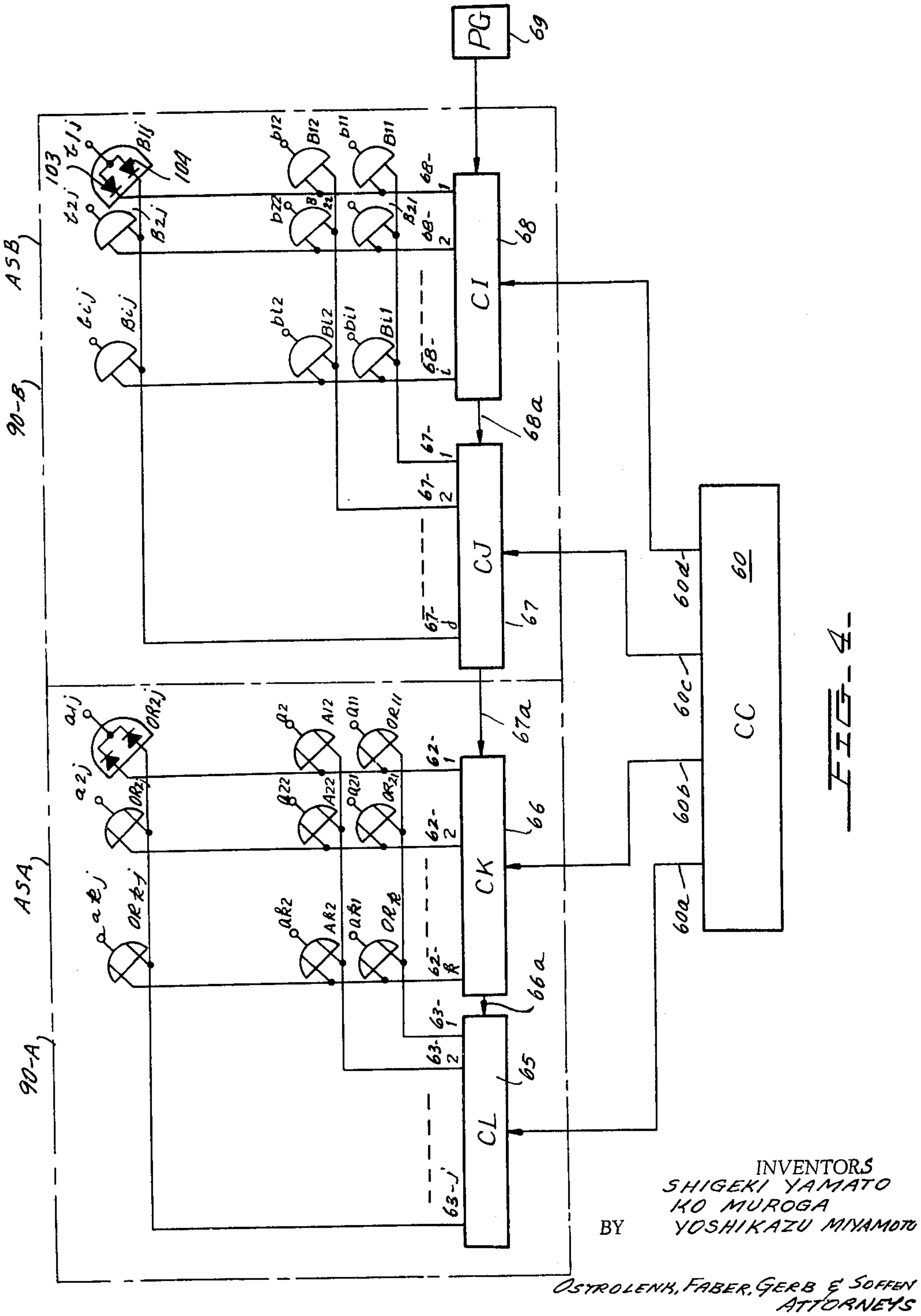
FIGURE 4 shows an address selection circuit, which may be employed in the control circuit of FIGURE 1.

FIGURE 4 shows one arrangement for the address selection circuits 90–A and 90–B of FIGURE 2, which is employed for the purpose of driving the amplifiers $A_1$ through $A_m$ and $B_1$ through $B_n$, respectively. Referring first to address selection circuit 90–A, the address selection circuit is provided with a plurality of columns 1, 2 . . . *k* of output terminals wherein each column is comprised of a plurality of individual output terminals 1 through *j* thereby forming a row and column matrix of output terminals of a total number of *k* times J terminals. The address selection circuit 90–A is further comprised of first and second groups of input terminals 62–1 through 62–K and 63–1 through 63–J. The input terminals of each group are paired in a manner shown in FIGURE 4 so that, for example, input terminal 63–1 is joined through OR gates, such as for example, the OR gates $OR_{11}$ through OR *ki* to all of the input terminals 62–1 through 62–K. All of the OR gates OR are of the type as shown in OR gate OR IJ which is comprised of diodes 101 and 102 having their cathode terminals connected in common to the output terminals $a_{1j}$ and their anode electrodes connected to the input terminals 62–1 and 63–*j* respectively.

The outputs $a_{1,1}$ through $a_{kj}$ of the OR circuits are connected to the input terminals of the corresponding driving amplifiers $A_1$ through $A_m$, respectively, as shown in FIGURE 2, and are grounded through the resistance 5 of each amplifier $A_1$ through $A_m$. It can therefore be seen that the total number of output terminals is K times J, where for example, K is equal to 50 and J is equal to 5, the total number of output terminals is 250. The OR gate arrangements OR provided in address selection circuit 90–A are of the well-known logical sum circuit. It will be assumed for the purposes of explanation that the presence of a positive voltage [12 volts] at the output terminal corresponds to a binary one condition and a zero voltage at the output terminal represents a binary zero condition. With this arrangement, all of the outputs of the OR circuits OR in address selection circuit 90–A are at the binary one level, except for the case where both input terminals to the specific OR gate are at the binary zero level. Let it further be assumed that a binary one and binary zero levels are made to correspond to the voltage $+E2$ and zero, respectively.

In order to drive the address selection circuit 90–A, central control circuitry 60 is provided with the electronic circuits 65 and 66, whose functions are such that only one of the K outputs of circuit 66 and only one of the J outputs of circuits 65 are at the binary zero level, while all of the remaining outputs are at the binary one level respectively. Thus, in the matrix arrangement of the OR circuits OR of address selection circuit 90–A, either or both inputs of all OR circuits, with the exception of one OR circuit are at the binary one level thereby developing binary one levels at their respective output terminals.

With the driving amplifier A connected to the one OR circuit having both inputs of which are at binary zero, the base current of the PNP transistor 6 of that amplifier [see FIGURE 2] flows from voltage $+E_1$ through resistance 5 with the result that the input potential of the driving amplifier A becomes approximately equal to $+E_1$ and both diodes in that particular OR circuit are in the cut-off condition.

In the case of the OR gates whose output terminals are at the binary one level a current flows from the OR circuit output terminal to the ground potential through resistance 5 of the amplifier A [see FIGURE 2] with the result that the input potential of driving amplifier A is approximately 12 volts, thus placing the PNP transistor 6 in a cut-off condition, as described previously.

Referring now to the address selection circuit 90–B, this circuit is likewise comprised of a plurality of input terminals 67–1 through 67–J comprising a first group of input terminals and a second plurality of input terminals 68–1 through 68–I, comprising a second group of input terminals. These input terminals are arranged in a matrix arrangement similar to that shown with respect to address selection circuit 90–A and are related to one another by means of the AND gates B, shown in FIGURE 4. For example, in this arrangement the input terminal 67–1 is related [i.e., connected] to all of the input terminals 68–1 through 68–I via the AND gate circuits $B_{1,1}$ through $B_{1,1}$ respectively. All of the AND gates B of the selection circuit 90–B are of the type such as shown by AND gate $B_{1,j}$ which is comprised of diodes 103 and 104 having their anode electrodes connected in common at an output terminal $b_{1,j}$. Thus, in this arrangement, a plurality of output terminals are provided such that they are arranged in I columns and J rows wherein the total number of output terminals is I times J.

The output terminals of the AND circuits $B_{1,1}$ through $B_{1,j}$ are connected to the input terminals of the corresponding driving amplifiers $B_1$ through $B_n$ respectively, which are shown in FIGURE 2 and are further connected to the voltages $+E_2$ through resistances 15 contained in each associated driving amplifier $B_1$ through $B_n$. Again it will be noted that with the output terminals arranged in I columns and J rows, and if I is equal to ten and J is equal to ten, then the total number of output terminals is equal to 100.

As is well known in the art, AND gates of the type shown in FIGURE 4 generate a binary zero voltage level at their output terminals *b*, except for the cases in which both input terminals are concurrently at the binary one level. In order to generate such voltages, the electronic circuits 67 and 68 are provided to perform the functions of making all of their J and I output terminals, respectively, at the binary zero level with the exception of one of I and one of J output terminals of the electronic circuits 67 and 68 respectively. With this arrangement there exists only one AND circuit B having both of its inputs at the binary one level, while either one or both of the inputs of all the remaining AND circuits are binary zero, causing the output levels thereof to be at the binary zero level.

With the driving amplifiers $B_1$ through $B_n$, as shown in FIGURE 2, connected to the respective AND circuits $B_{1,1}$ through $B_{1,j}$, all of which, except for one, are at the binary zero level, a current flows from $+E_1$ to a ground potential through the resistor 15 [see FIGURE 2, amplifier B] and a diode in the AND circuit connected therewith, such as for example, the AND circuit $B_{1,j}$, the input potential of the driving amplifier becoming approximately equal to zero potential thereby placing NPN transistor in the cut-off condition, as was previously described. With the driving amplifier B connected to the AND circuit $B_{1,j}$, which has a binary one level at its output terminal, a current flows from voltage $+E_2$ to voltage $-E_1$ through resistor 15, zener diode 12 [which has approximately a 12 volt rating], and base and emitter of NPN transistor 13, wherein the input potential of the driving amplifier is approximately equal to $+6$ volts. Thus, both diodes of the AND circuit $B_{1,j}$ are in the cut-off condition.

Thus, by so controlling the electronic circuits 65 through 68, from either a pulse generating source, such as the generating source 69, or from the central control 60, in such a manner that only one of the J outputs of circuit 65 and one of the K outputs of circuits 66 are at the binary one level and one of the J outputs of circuit 67 and one of the outputs of circuits 68 are at the binary zero level, then it becomes possible to make only one of the *m* driving amplifiers A and only one of the *n* driving amplifiers B conductive, thus, providing a current pulse in only one of the *m* times *n* subscribers [or trunk circuits] for obtaining information as to a busy, idle, or call originating condition together with equipment number, service class, and so forth, of the associated subscriber. Therefore, for example, if the number of outputs of circuits 68 is equal to ten, that of circuit 67 is equal to ten, that of circuit 66 is equal to ten and that of circuit 65 is equal to ten, then ten times ten times ten times ten equals 10,000 subscribers, or trunk circuits which can be handled by 40 output terminals provided therein.

Referring to the circuit of FIGURE 4, the electronic circuits 65 through 68 may be counter circuits consisting of a plurality of flip-flop stages which are connected in a cascade arrangement, as shown by connections 69*d* through 66*a* respectively, wherein pulses are applied to the counter circuits from the pulse generator 69 and the counter circuits are adapted to step in the regular sequence thereby providing the stepping function for the scanning circuit in order to scan the conditions of all subscriber lines associated with the network. In addition, by transmitting information corresponding to the called subscriber number via the line 60*a* through 60*d*, as shown in FIGURE 4, to the associated circuits 65 through 68. This arrangement is thereby employed to provide a pulse to the conductor which is connected between the two driving amplifiers of the amplifier groups A and B [see FIGURE 2], corresponding to the called subscriber, thus making it possible to obtain information such as the idle, or busy status and equipment number of the called subscriber.

As will be evident from the foregoing description, the most significant feature of the instant invention resides in achieving the substantial reduction in the number and sizes of components and hardware necessary for scanning and monitoring subscriber lines by directly combining the address selection circuit necessary for scanning subscriber lines and trunks with the address selection circuit necessary for identifying the corresponding subscriber information related to the subscriber location which activities are combined in a single system. Another important aspect of this invention resides in the fact that the subscriber circuits and circuits associated with trunks are electrically connected with a semi-permanent memory circuit capable of storing various types of information such as subscriber equipment numbers, subscriber service classes and so on for said subscribers and for trunks on the output side of the address selection circuit. It is possible to obtain this information simultaneously with the status determining function, thereby simplifying the connecting operation between calling and called subscriber and thereby substantially reducing the holding time. With this arrangement, the instant invention finds advantageous application in automatic telephone switching systems for example, which when so used simplify circuit construction of the switching systems, deduction of holding times and substantial economic savings due to the sharing of the address selection control circuit between the subscriber line circuits and the status determining circuits.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Subscriber line monitoring means for simultaneously determining the identity and status of a plurality of subscriber lines which are scanned in a predetermined sequence comprising first type means for sequentially scanning said subscriber lines; a plurality of second type means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means.

2. Subscriber line monitoring means for simultaneously determining the identity and status of a plurality of subscriber lines which are scanned in a predetermined sequence comprising first type means for sequentially scanning said subscriber lines; a plurality of second type means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means, each of said second type means being adapted to generate signals representing the status of its associated subscriber line; third type means for receiving and storing said status signals and said identification signals for subsequent use thereof.

3. Subscriber line monitoring means for simultaneously determining the identity and status of a plurality of subscriber lines which are scanned in a predetermined sequence comprising first type means for sequentially scanning said subscriber lines; a plurality of second type means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means, each of said second type means being adapted to generate signals representing the status of its associated subscriber line; third type means for receiving and storing said status signals and said identification signals for subsequent use thereof, said third means being adapted to halt said first type means when said status signals and said identification signals are being received by said third type means.

4. Subscriber line monitoring means for simultaneously determining the identity and status of a plurality of subscriber lines which are scanned in a predetermined sequence comprising first type means for sequentially scanning said subscriber lines; a plurality of second type means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means, said first type means including a plurality of output terminal means, each of said terminal means being capable of assuming either of two distinct voltage conditions; said memory means comprising a plurality of coupling elements; a plurality of memory input conductors connected to said output terminal means; a plurality of memory output amplifiers; said coupling means being adapted to energize selected ones of said memory output amplifiers in a predetermined manner under control of the voltages impressed upon said memory input conductors; said memory means being adapted to select for energization a different combination of memory output amplifiers for each of said memory input conductors.

5. Subscriber line monitoring means for simultaneously determining the identity and status of a plurality of subscriber lines which are scanned in a predetermined sequence comprising first type means for sequentially scanning said subscriber lines; a plurality of second means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means, said first type means including a plurality of output terminal means, each of said terminal means being capable of assuming either of two distinct voltage conditions; said memory means comprising a plurality of coupling elements; a plurality of memory input conductors connected to said output terminal means; a plurality of memory output amplifiers; said coupling means being adapted to energize selected ones of said memory input conductors; said memory means being adapted to select for energization a different combination of memory output amplifiers for each of said memory input conductors, each of said second type means comprising an electronic circuit electrically coupled to its associated subscriber line and having fifth type means for coupling said third type means to said subscriber line; first and second circuit branches selectively energizeable by its associated subscriber line for generating said status signals; said status signals being generated when the memory input conductor associated with said second type means is energized.

6. Subscriber line monitoring means for simultaneously determining the identity and status of a plurality of subscriber lines which are scanned in a predetermined sequence comprising first type means for sequentially scanning said subscriber lines; a plurality of second type means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means, said first type means including a plurality of output terminal means, each of said terminal means being capable of assuming either of two different voltage conditions; said memory means comprising a plurality of coupling elements; a plurality of memory input conductors connected to said output terminal means; a plurality of memory output amplifiers; said coupling means being adapted to energize selected ones of said memory output amplifiers in a predetermined manner under control of the voltages impressed upon said memory input conductors; said memory means being adapted to select for energization a different combination of memory output amplifiers for each of said memory input conductors, each of said second type means comprising an electronic circuit electrically coupled to its associated subscriber line and having fifth type means for coupling said third type means to said subscriber line; first and second circuit branches selectively energizeable by its associated subscriber line for generating said status signals; said status signals being generated when the memory input conductor associated with said second type means is energized, the first and second type circuits of each of said second type means being oppositely polarized so as to provide energization of only one of said circuits at any given instant of time.

7. Subscriber line monitoring means for simultaneously determining the identity and status of a plurality of subscriber lines which are scanned in a predetermined sequence comprising first type means for sequentially scanning said subscriber lines; a plurality of second types means each being associated with one of said subscriber lines for determining the status of its associated subscriber line upon energization by said first type means: memory means for storing coded information related to each of said subscriber lines: said memory means having an output circuit adapted to generate identification signals representing the coded information relative to the subscriber line being monitored under control of said first type means, said first type means including a plurality of output terminal means, each of said terminal means being capable of assuming either of two distinct voltage conditions: said memory means comprising a plurality of coupling elements: a plurality of memory input conductors connected to said output terminal means: a plurality of memory output amplifiers: said coupling means being adapted to energize selected ones of said memory output amplifiers in a predetermined manner under control of the voltages impressed upon said memory input conductors: said memory means being adapted to select for energization a different combination of memory output amplifiers for each of said memory input conductors, said first type means further comprising sixth type means for driving all but one of said terminal means to one of said two voltage levels and for driving the said one of said terminal means to the other of said two voltage levels; the said one of said two terminal means being adapted to energize its associated memory input conductor for generating the identification signals related to the subscriber line being monitored.

8. Subscriber line monitoring means for simultaneously determining the identity and status of a plurality of subscriber lines which are scanned in a predetermined sequence comprising first type means for sequentially scanning said subscriber lines; a plurality of second type means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means, said first type means including a plurality of output terminal means, each of said terminal means being capable of assuming either of two distinct voltage conditions; said memory means comprising a plurality of coupling elements; a plurality of memory input conductors connected to said output terminal means; a plurality of memory output amplifiers: said coupling means being adapted to energize selected ones of said memory output amplifiers in a predetermined manner under control of the voltages impressed upon said memory input conductors: said memory means being adapted to select for energization a different combination of memory output amplifiers for each of said memory input conductors, said first type means further comprising sixth type means for driving all but one of said terminal means to one of said two voltage levels and for driving the said one of said terminal means to the other of said two voltage levels: the said one of said two terminal means being adapted to energize its associated memory input conductor for generating the identification signals related to the subscriber line being monitored, the selected one of the second type means coupled to the energized memory input conductor being energized simultaneously with said memory input conductor for simultaneously generating the identifying information and status of the subscriber line being scanned.

9. Subscriber line monitoring means for simultaneously determining the identity and status of a plurality of subscriber lines which are scanned at random sequence comprising first type means for scanning said subscriber lines at random; a plurality of second means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means.

10. Subscriber line monitoring means for simultaneously determining the identity and status of a plurality of subscriber lines which are scanned at random sequence comprising first type means for scanning said subscriber at random; a plurality of second type means each being associated with one of said subscriber lines upon energization by said first type means; memory means for storing coded information related to each of said subscriber lines; said memory means having an output circuit adapted to generate identification signals representing the coded information relative to the subscriber line being monitored under control of said first type means, each of said second type means being adapted to generate signals representing the status of its associated subscriber line; third type means for receiving and storing said status signals and said identification signals for subsequent use thereof.

11. Subscriber line monitoring means for simultaneously determining the identity and status of a plurality of subscriber lines which are scanned at random sequence comprising first type means for scanning said subscriber lines at random; a plurality of second type means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means, each of said second type means being adapted to generate signals representing the status of its associated subscriber line; third type means for receiving and storing said status signals and said identification signals for subsequent use thereof, said third type means being adapted to halt said first type means when said status signals and said identification signals are being received by said third type means.

12. Subscriber line monitoring means for simultaneously determining the identity and status of a plurality of subscriber lines which are scanned at random sequence comprising first type means for scanning said subscriber lines at random; a plurality of second type means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means, said first type means including a plurality of output terminal means, each of said terminal means being capable of assuming either of two distinct voltage conditions; said memory means comprising a plurality of coupling elements; a plurality of memory input conductors connected to said output terminal means; a plurality of memory output amplifiers; said coupling means being adapted to energize selected ones of said memory output amplifiers in a predetermined manner under control of the voltages impressed upon said memory input conductors; said memory means being adapted to select for energization a different combination of memory output amplifiers for each of said memory input conductors.

13. Subscriber line monitoring means for simultaneously determining the identity and status of a plurality of subscriber lines which are scanned at random sequence comprising first type means for scanning said subscriber lines at random; a plurality of second type means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means, said first type means including a plurality of output terminal means, each of said terminal means being capable of assuming either of two distinct voltage conditions; said memory means comprising a plurality of coupling elements; a plurality of memory input conductors connected to said output terminal means; a plurality of memory output amplifiers; said coupling means being adapted to energize selected ones of said memory output amplifiers in a predetermined manner under control of the voltages impressed upon said memory input conductors; said memory means being adapted to select for energization a different combination of memory output amplifiers for each of said memory input conductors, each of said second type means comprising an electronic circuit electrically coupled to its associated subscriber line and having fifth type means for coupling said third type means to said subscriber line; first and second circuit branches selectively energizeable by its associated subscriber line for generating said status signals; said status signals being generated when the memory input conductor associated with said second type means is energized.

14. Subscriber line monitoring means for simultaneously determining the identity and status of a plurality of subscriber lines which are scanned at random sequence comprising first type means for scanning said subscriber lines at random; a plurality of second type means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means, said first type means including a plurality of output terminal means, each of said terminal means being capable of assuming either of two distinct voltage conditions; said memory means comprising a plurality of coupling elements; a plurality of memory input conductors connected to said output terminal means; a plurality of memory output amplifiers; said coupling means being adapted to energize selected ones of said memory output amplifiers in a predetermined manner under control of the voltages impressed upon said memory input conductors; said memory means being adapted to select for energization a different combination of memory output amplifiers for each of said memory input conductors, each of said second type means comprising an electronic circuit electrically coupled to its associated subscriber line and having fifth type means for coupling said third type means to said subscriber line; first and second circuit branches selectively energizeable by its associated subscriber line for generating said status signals; said status signals being generated when the memory input conductor associated with said second type means is energized, the first and second type circuits of each of said second means being oppositely polarized so as to provide energization of only one of said circuits at any given instant of time.

15. Subscriber line monitoring means for simultaneously determining the identity and status of a plurality of subscriber lines which are scanned at random sequence comprising first type means for scanning said subscriber lines at random; a plurality of second type means each being associated with one of said subscriber lines for determining the status of its associated subscriber line upon energization by said first type means; memory means for storing coded information related to each of said subscriber lines; said memory means having an output circuit adapted to generate identification signals representing the coded information relative to the subscriber line being monitored under control of said first type means, said first type means including a plurality of output terminal means, each of said terminal means being capable of assuming either of two distanct voltage conditions; said memory means comprising a plurality of coupling elements; a plurality of memory input conductors connected to said output terminal means; a plurality of memory output amplifiers; said coupling means being adapted to energize selected ones of said memory output amplifiers in a predetermined manner under control of the voltages impressed upon said memory input conductors; said memory means being adapted to select for energization a different combination of memory output amplifiers for each of said memory input conductors, said first type means further comprising sixth type means for driving all but one of said terminal means to one of said two voltage levels and for driving the said one of said terminal means to the other of said two voltage levels; the said one of said two terminal means being adapted to energize its associated memory input conductor for generating the identification signals related to the subscriber line being monitored.

16. Subscriber line monitoring means for simultaneously determining the identity and status of a plurality of subscriber lines which are scanned at random sequence comprising first type means for scanning said subscriber lines at random; a plurality of second type means each being associated with one of said subscriber lines for determining the status of its associated subscriber line upon energization by said first type means;

memory means for storing coded information related to each of said subscriber lines; said memory means having an output circuit adapted to generate identification signals representing the coded information relative to the subscriber line being monitored under control of said first type means, said first type means including a plurality of output terminal means, each of said terminal means being capable of assuming either of two distinct voltage conditions; said memory means comprising a plurality of coupling elements; a plurality of memory input conductors connected to said output terminal means; a plurality of memory output amplifiers; said coupling means being adapted to energize selected ones of said memory output amplifiers in a predetermined manner under control of the voltages impressed upon said memory input conductors; said memory means being adapted to select for energization a different combination of memory output amplifiers for each of said memory input conductors, said first type means further comprising sixth type means for driving all but one of said terminal means to one of said two voltage levels and for driving the said one of said terminal means to the other of said two voltage levels; the said one of said two terminal means being adapted to energize its associated memory input conductor for generating the identification signals related to the subscriber line being monitored, the selected one of the second type means coupled to the energized memory input conductor being energized simultaneously with said memory input conductor for simultaneously generating the identifying information and status of the subscriber line being scanned.

References Cited by the Examiner

UNITED STATES PATENTS

| | | | |
|---|---|---|---|
| 2,764,634 | 9/1956 | Brooks et al. | 179—18 |
| 2,929,879 | 3/1960 | Jacobaeus et al. | 179—18 X |
| 2,930,852 | 3/1960 | Harris | 179—18 |
| 3,015,699 | 1/1962 | Faulkner et al. | 179—18 |

ROBERT H. ROSE, *Primary Examiner.*

WILLIAM C. COOPER, *Examiner.*